(12) United States Patent
Takeshima et al.

(10) Patent No.: US 7,915,195 B2
(45) Date of Patent: Mar. 29, 2011

(54) EXHAUST GAS PURIFYING CATALYST AND PRODUCTION PROCESS THEREOF

(75) Inventors: Shinichi Takeshima, Numazu (JP); Akio Koyama, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/309,105

(22) PCT Filed: Jul. 12, 2007

(86) PCT No.: PCT/JP2007/064292
§ 371 (c)(1),
(2), (4) Date: Jan. 7, 2009

(87) PCT Pub. No.: WO2008/007811
PCT Pub. Date: Jan. 17, 2008

(65) Prior Publication Data
US 2009/0325793 A1 Dec. 31, 2009

(30) Foreign Application Priority Data
Jul. 12, 2006 (JP) .................. 2006-191662

(51) Int. Cl.
*B01J 23/10* (2006.01)
(52) U.S. Cl. .................................. 502/304
(58) Field of Classification Search .................. None
See application file for complete search history.

(56) References Cited

U.S. PATENT DOCUMENTS

| 5,883,037 A * | 3/1999 | Chopin et al. ............... 502/308 |
| 5,915,951 A | 6/1999 | Euzen et al. |
| 2004/0234439 A1 * | 11/2004 | Takeshima et al. ........... 423/263 |
| 2005/0255993 A1 * | 11/2005 | Tanaka et al. ................ 502/302 |

FOREIGN PATENT DOCUMENTS

| EP | 0 525 677 A1 | 2/1993 |
| JP | A-6-106062 | 4/1994 |
| JP | A-9-173850 | 7/1997 |
| JP | A-10-216509 | 8/1998 |
| JP | A-2003-33669 | 2/2003 |
| JP | A-2004-160433 | 6/2004 |
| JP | A-2004-345890 | 12/2004 |
| JP | A-2005-125317 | 5/2005 |
| JP | A-2005-296735 | 10/2005 |
| JP | A-2005-349383 | 12/2005 |
| JP | A-2006-27933 | 2/2006 |

OTHER PUBLICATIONS

Aneggi Eleonora et al., Promotional Effect of Rare Earths and Transition Metals in the Combustion of Diesel Soot Over $CeO_2$ and $CeO_2$-$ZrO_2$, Catalysis Today, Apr. 30, 2006, vol. 114, No. 1, pp. 40-47.

* cited by examiner

*Primary Examiner* — Melvin C Mayes
*Assistant Examiner* — Stefanie Cohen
(74) *Attorney, Agent, or Firm* — Oliff & Berridge, PLC

(57) ABSTRACT

An exhaust gas purifying catalyst is disclosed, comprising a ceria-zirconia solid solution and an iron oxide dispersed and at least partially solid-dissolved in the ceria-zirconia solid solution. A process for producing the exhaust gas purifying catalyst of the present invention is also disclosed.

10 Claims, 2 Drawing Sheets

EXHAUST GAS PURIFYING CATALYST AND PRODUCTION PROCESS THEREOF

TECHNICAL FIELD

The present invention relates to an exhaust gas purifying catalyst, and a production process thereof. More specifically, the present invention relates to an exhaust gas purifying catalyst for purifying automobile exhaust gas and a production process thereof.

BACKGROUND ART

The exhaust gas from an internal combustion engine, such as an automobile engine, contains nitrogen oxide ($NO_x$), carbon monoxide (CO), hydrocarbon (HC) and the like. These substances can be purified by an exhaust gas purifying catalyst capable of oxidizing CO and HC and at the same time, reducing $NO_x$. As a representative exhaust gas purifying catalyst, a three-way catalyst comprising a noble metal, such as platinum (Pt), rhodium (Rh) and palladium (Pd), and a porous metal oxide support, such as γ-alumina supporting the noble metal, is known.

However, such a noble metal is expensive and may be in short supply in the future due to a reduction in reserves. Accordingly, use of a perovskite-type solid solution, as a catalyst other than a noble metal, is proposed as a catalyst for purifying an exhaust gas.

Regarding the perovskite-type solid solution as a catalyst, Japanese Unexamined Patent Publication No. 6-106062 proposes an exhaust gas purifying catalyst designed to have a high exhaust gas purifying performance even at low temperatures such as idling time by using a perovskite-type solid solution as the core and disposing, on the core, a perovskite-type solid solution having a noble metal solid-dissolved therein.

As for the base metal-based exhaust gas purifying catalyst, it is also known to use iron oxide.

Japanese Unexamined Patent Publication No. 2005-296735 discloses a catalyst obtained by loading iron oxide on a support containing a ceria-zirconia solid solution, wherein the support has 0.1 mL/g or more of pores having a pore diameter of 3.5 to 150 nm. Japanese Unexamined Patent Publication No. 2005-296735, describes that, in such a catalyst, the iron oxide acts as an active site.

Japanese Unexamined Patent Publication No. 2004-160433 proposes a technique of forming a solid solution of iron and at least one metal selected from the group consisting of cerium, zirconium, aluminum, titanium and manganese, so as to utilize the oxygen storage capacity (OSC) of iron, which is attributable to a change in valence between $Fe_2O_3$ and $Fe_3O_4$. Also, in Japanese Unexamined Patent Publication No. 2004-160433, it is indicated that in the case of using this solid solution as a catalyst, HC and CO can be oxidized by allowing the iron to act as an active site.

In Japanese Unexamined Patent Publication No. 2004-160433, a solid solution concretely shown is only an iron oxide-titania solid solution, and it is stated that the iron oxide-titania solid solution provides OSC through the following reactions:

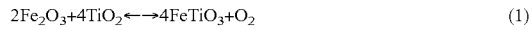

$$2Fe_2O_3 + 4TiO_2 \leftrightarrow 4FeTiO_3 + O_2 \quad (1)$$

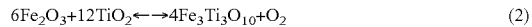

$$6Fe_2O_3 + 12TiO_2 \leftrightarrow 4Fe_3Ti_3O_{10} + O_2 \quad (2)$$

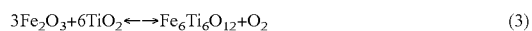

$$3Fe_2O_3 + 6TiO_2 \leftrightarrow Fe_6Ti_6O_{12} + O_2 \quad (3)$$

As described in these publications, it is known to use a base metal (e.g., iron) as a catalyst metal for an exhaust gas purifying catalyst. However, particularly, a catalyst using iron as a catalyst metal has a problem that the oxidation state of iron changes during use of the catalyst, and the catalyst deteriorates due to change in the iron volume. In the case of loading iron at a high concentration on the surface of a ceria-zirconia solid solution as described in Japanese Unexamined Patent Publication No. 2005-296735, there is a problem that the surface area of the catalyst decreases and causes deterioration in the performance of the catalyst.

Accordingly, an object of the present invention is to provide an exhaust gas purifying catalyst, which solves conventional problems regarding use of iron as a catalyst metal and has good OSC.

DISCLOSURE OF THE INVENTION

The exhaust gas purifying catalyst of the present invention comprises a ceria-zirconia solid-solution (composite metal oxide) and an iron oxide dispersed and at least partially solid-dissolved in the ceria-zirconia solid solution.

In one embodiment of the exhaust gas purifying catalyst of the present invention, the amount of the iron constituting the iron oxide is from 1 to 20 mol % based on all metal atoms contained in the exhaust gas purifying catalyst.

In one embodiment of the exhaust gas purifying catalyst of the present invention, the molar ratio of zirconium/(cerium+zirconium) in the ceria-zirconia solid solution is from 0.2 to 0.8.

In one embodiment of the exhaust gas purifying catalyst of the present invention, the exhaust gas purifying catalyst further comprises a metal oxide selected from the group consisting of an alkaline earth metal oxide and a rare earth oxide excluding ceria, which is dispersed and at least partially solid-dissolved in the ceria-zirconia solid solution.

The process of the present invention for producing an exhaust gas purifying catalyst comprises the following steps:

providing a liquid dispersion comprising a hydrophobic solvent phase and an aqueous phase dispersed therein, hydrolyzing a cerium salt, a zirconium salt and an iron salt in the aqueous phase dispersed in the liquid dispersion to precipitate a metal oxide precursor, and then aggregating the metal oxide precursor, and drying and firing the aggregated metal oxide precursor.

BEST MODE FOR CARRYING OUT THE INVENTION

Figure 1:
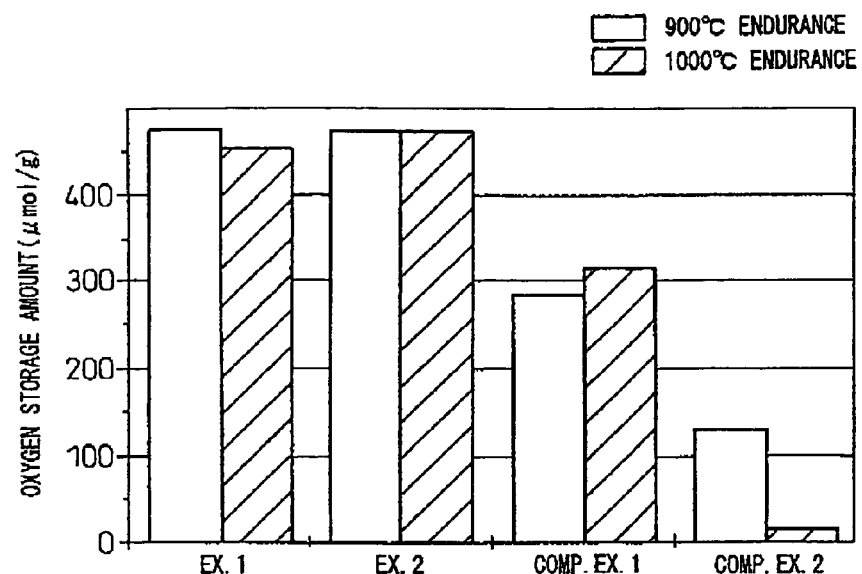
FIG. 1 is a view showing OSC, regarding exhaust gas purifying catalysts of Comparative Examples 1 and 2 and Examples 1 and 2 after endurance.

Exhaust Gas Purifying Catalyst of the Invention

The exhaust gas purifying catalyst of the present invention comprises a ceria-zirconia solid solution and an iron oxide dispersed and at least partially solid-dissolved in the ceria-zirconia solid solution.

According to the exhaust gas purifying catalyst of the present invention, an iron oxide is used as a catalyst metal, so that OSC by the ceria-zirconia solid solution can be provided even in the case of not using a noble metal. According to the exhaust gas purifying catalyst of the present invention, an iron oxide is dispersed and at least partially solid-dissolved in the ceria-zirconia solid solution, so that the catalyst can be prevented from deterioration due to precipitation of a sole iron oxide ($Fe_3O_4$ or $Fe_2O_3$).

The content of the iron oxide in the ceria-zirconia solid solution may be selected such that the iron oxide is not unstabilized in the ceria-zirconia solid solution while allowing the iron oxide to catalyze OSC of the ceria-zirconia solid solution. Accordingly, for example, the content of the iron constituting the iron oxide may be from 1 to 20 mol %, particularly from 3 to 15 mol %, more particularly from 5 to 10 mol %, based on all metal atoms contained in the exhaust gas purifying catalyst.

If the content of the iron oxide in the ceria-zirconia solid solution is excessively large, the heat resistance of the obtained exhaust gas purifying catalyst decreases, and thereby the OSC may be weakened. This is considered to occur because the iron oxide does not tend to form a replacement-type solid solution with the ceria-zirconia solid solution for the following reasons:

(1) the ceria-zirconia solid solution is formed from 8-coordinate cerium and zirconium, whereas divalent iron and trivalent iron are 6-coordinate ions; and (2) the ion radius of iron (divalent; 0.78 Å, trivalent: 0.65 Å) is smaller than the both of ion radius of cerium (trivalent: 1.14 Å, tetravalent: 0.97 Å) and the ion radius of zirconium (tetravalent: 0.84 Å).

If the content of the iron oxide in the ceria-zirconia solid solution is excessively small, the amount of the catalytic component in the obtained exhaust gas purifying catalyst is small, and thereby the OSC may not be sufficiently brought out.

In the exhaust gas purifying catalyst of the present invention, the molar ratio of zirconium/(cerium+zirconium) in the ceria-zirconia solid solution may be selected to provide OSC by the ceria-zirconia solid solution, and good heat resistance. Accordingly, this ratio may be, for example, from 0.2 to 0.8, particularly from 0.4 to 0.6.

In the exhaust gas purifying catalyst of the present invention, in order to improve the heat resistance of the ceria-zirconia solid solution, a metal oxide selected from the group consisting of an alkaline earth metal oxide and a rare earth oxide excluding ceria, particularly a rare earth oxide, for example an oxide of a rare earth selected from the group consisting of yttrium, lanthanum, cerium, praseodymium, neodymium and samarium may be solid-dissolved. The metal oxide selected from the group consisting of an alkaline earth metal oxide and a rare earth oxide may be incorporated into the ceria-zirconia solid solution, for example, in an amount of 1 to 20 mol %, particularly from 1 to 15 mol %, more particularly from 1 to 12 mol %, based on all metal atoms contained in the exhaust gas purifying catalyst.

In the exhaust gas purifying catalyst of the present invention, a noble metal such as platinum, rhodium or palladium, and/or an NO, storage element, i.e., an element selected from the group consisting of an alkali metal and an alkaline earth metal, particularly lithium and barium, may be further supported.

Loading of the noble metal and $NO_x$ storage element in the exhaust gas purifying catalyst of the present invention may be performed by any method. For example, in the case of loading platinum in the exhaust gas purifying catalyst of the present invention, this may be attained by absorbing, into the catalyst, a solution containing a salt and/or a complex of platinum, for example an aqueous dinitrodiamine platinum solution, and then drying and firing the catalyst. The amount of platinum supported on the exhaust gas purifying catalyst of the present invention may be from 0.01 to 5 mass %, particularly from 0.1 to 2 mass %, based on the catalyst.

The exhaust gas purifying catalyst of the present invention may be used not only by shaping the catalyst itself, but also by coating it on a monolithic substrate, for example a ceramic honeycomb monolithic substrate.

The exhaust gas purifying catalyst of the present invention may be produced by any method by which iron oxide can be dispersed and at least partially solid-dissolved in a ceria-zirconia solid solution. Accordingly, in particular, the exhaust gas purifying catalyst of the present invention can be produced by the process of the present invention for producing an exhaust gas purifying catalyst.

[Process of the Invention for Producing Exhaust Gas Purifying Catalyst]

The process of the present invention for producing an exhaust gas purifying catalyst comprises the following steps:

providing a liquid, dispersion comprising a hydrophobic solvent phase and an aqueous phase dispersed therein, hydrolyzing a cerium salt, a zirconium salt and an iron salt in the aqueous phase dispersed in the liquid dispersion to precipitate a metal oxide precursor, and then aggregating the metal oxide precursor, and drying and firing the aggregated metal oxide precursor.

According to the process of the present invention, a metal oxide precursor containing cerium, zirconium and iron is precipitated in a fine water droplet, and thereby a metal oxide precursor comprising highly dispersed precursors of ceria, zirconia and iron oxide can be obtained. Therefore, according to the process of the present invention, the exhaust gas purifying catalyst of the present invention can be obtained.

In the process of the present invention for producing an exhaust gas purifying catalyst, first, a liquid dispersion comprising a hydrophobic solvent phase and an aqueous phase dispersed therein, particularly a microemulsion having the aqueous-phase droplet diameter of from 2 to 100 nm, preferably from 2 to 50 nm, more preferably from 2 to 40 nm, is provided generally by using a surfactant.

As the hydrophobic solvent, a hydrocarbon such as cyclohexane and benzene, a linear alcohol such as hexanol, and ketones such as acetone may be used.

The surfactant which can be used for obtaining the liquid dispersion may be any of a nonionic surfactant, an anionic surfactant and a cationic surfactant, and may be selected in view of the hydrophobic solvent.

Examples of the nonionic surfactant include a polyoxyethylene nonylphenyl ether-based surfactant such as polyoxyethylene (n=5) nonylphenyl ether, a polyoxyethylene octylphenyl ether-based surfactant such as polyoxyethylene (n=10) octylphenyl ether, and a polyoxyethylene alkyl ether-based surfactant such as polyoxyethylene (n=7) cetyl ether. Examples of the anionic surfactant include sodium di-2-ethylhexyl sulfosuccinate, and examples of the cationic surfactant include cetyl trimethylammonium chloride and cetyl trimethylammonium bromide.

In the process of the present invention for producing an exhaust gas purifying catalyst, next, a cerium salt, a zirconium salt and an iron salt are hydrolyzed in the aqueous phase dispersed in the liquid dispersion obtained above to precipitate a metal oxide precursor, and then the meal oxide precursor are aggregated.

In order to precipitate the metal oxide precursor in a water droplet, a cerium salt and the like can be hydrolyzed by adding a basic solution such as aqueous ammonia or aqueous sodium hydroxide solution to the liquid dispersion, and thereby causing the liquid dispersion to have a relatively basic property. Generally, use of aqueous ammonia is preferred in view of easy removal.

As the cerium salt, zirconium salt and iron salt, any water-soluble salt may be used, and for example, an inorganic acid salt such as nitrate and chloride, or an organic acid salt such as acetate, lactate and oxalate, particularly nitrate, may be used.

Incidentally, in the case where a component other than iron oxide, for example a metal oxide selected from the group consisting of an alkaline earth metal oxide and a rare earth oxide excluding ceria, is contained in the ceria-zirconia solid solution, a salt of a metal constituting this metal oxide, for example lanthanum nitrate, may be hydrolyzed together with a cerium salt and the like in the aqueous phase.

In the process of the present invention for producing an exhaust gas purifying catalyst, finally, the metal oxide precursor aggregated above is dried and fired.

Drying and firing of the metal oxide precursor may be performed at any temperature at which iron oxide can be solid-dissolved in the ceria-zirconia solid solution. This may be achieved by, for example, placing and drying the metal oxide precursor in an oven at 120° C., and then firing the thus-dried metal oxide precursor at a temperature generally employed in the synthesis of a metal oxide, for example at a temperature of 500 to 1,100° C.

The present invention is described in greater detail below based on Examples, but the present invention is not limited thereto.

EXAMPLES

Example 1

In this Example, an iron oxide-ceria-zirconia solid solution having a composition of Fe:Ce:Zr (molar ratio)=5:40:55 was produced as follows by a microemulsion method.

Polyoxyethylene (n=5) nonylphenyl ether (NP-5) as a surfactant was added to a cyclohexane solvent to form a hydrophobic solvent. Iron nitrate, cerium nitrate, zirconium oxynitrate and a very small amount of alkylammonium were dissolved in water to prepare an aqueous phase solution. The thus-obtained aqueous phase solution was poured in the hydrophobic solvent, and thoroughly stirred over 1 hour to prepare a water-in-oil type microemulsion solution having an aqueous droplet diameter of 40 nm. In this microemulsion solution, the O/S ratio (molar ratio of hydrophobic solvent phase (Oil phase)/Surfactant) was 6.

The microemulsion solution obtained above was adjusted to a pH of 8.0 by adding aqueous ammonia thereto to precipitate a secondary particle of an iron oxide-ceria-zirconia solid solution precursor. Furthermore, water was added to the microemulsion solution to cause phase separation and thereby aggregate the precursor into the secondary particle, and then the aggregated precursor was aged for more than 60 minutes. Thereafter, the surfactant was removed from the solid solution precursor by washing with ethanol, and the obtained solid solution precursor was dried and fired to obtain an iron oxide-ceria-zirconia solid solution catalyst of Example 1. The outline of the catalyst is shown in Table 1 below.

Example 2

A lanthanum oxide-iron oxide-ceria-zirconia solid solution having a composition of La:Fe:Ce:Zr (molar ratio)=3:5: 40:52 was obtained in the same manner as in Example 1, except that lanthanum nitrate was additionally added in the preparation of the aqueous phase solution. The outline of this catalyst is shown in Table 1 below.

Comparative Example 1

In Comparative Example 1, an alumina ceria-zirconia solid solution having a composition of Al:Ce:Zr (molar ratio)=1: 1:1 was produced by a co-precipitation method as follows, and then platinum was loaded on this solid solution to obtain an exhaust gas purifying catalyst of Comparative Example 1.

Aluminum nitrate, cerium nitrate and zirconium oxynitrate were added to distilled water to obtain an aqueous raw material solution. Aqueous ammonia was added to the aqueous raw material solution to precipitate a secondary particle of an alumina ceria-zirconia solid solution precursor, and then the precursor was aged over 60 minutes. Thereafter, the obtained solid solution precursor was dried and fired to obtain an alumina ceria-zirconia solid solution support.

On the thus-obtained alumina ceria-zirconia solid solution, platinum was loaded in an amount of 1 mass % based on the alumina ceria-zirconia solid solution by an impregnation process using a dinitrodiamine platinum solution. The outline of the obtained catalyst is shown in Table 1 below.

Comparative Example 2

In Comparative Example 2, on an alumina ceria-zirconia solid solution support obtained as in Comparative Example 1, iron was loaded in an amount of 5 mass % based on the alumina ceria-zirconia solid solution by an absorption process using an iron nitrate solution. The outline of the obtained catalyst is shown in Table 1 below.

Examples 3 to 8

The exhaust gas purifying catalysts of Examples 3 to 8 were obtained in the same manner as in Example 2, except that the molar ratio of La:Fe:Ce:Zr was changed as shown in Table 1 below in the preparation of the aqueous phase solution.

TABLE 1

Catalysts of Examples and Comparative Examples

| | Construction of Catalyst | Catalyst Composition (molar ratio) | | | | | Zr/(Ce + Zr) |
|---|---|---|---|---|---|---|---|
| | | La | Fe | Al | Ce | Zr | |
| Example 1 | FeCeZrO$_x$ | — | 5 | — | 40 | 55 | 0.58 |
| Example 2 | LaFeCeZrO$_x$ | 3 | 5 | — | 40 | 52 | 0.57 |
| Comparative Example 1 | Pt/AlCeZrO$_x$ | — | (Pt: 1 mass %*) | 1 | 1 | 1 | 0.50 |
| Comparative Example 2 | Fe/AlCeZrO$_x$ | — | (Fe: 5 mass %*) | 1 | 1 | 1 | 0.50 |
| Example 3 | LaFeCeZrO$_x$ | 4 | 1 | — | 40 | 55 | 0.58 |
| Example 4 | | 4 | 3 | — | 40 | 53 | 0.57 |
| Example 5 | | 4 | 5 | — | 40 | 51 | 0.56 |
| Example 6 | | 4 | 7 | — | 40 | 49 | 0.55 |
| Example 7 | | 4 | 10 | — | 40 | 46 | 0.53 |
| Example 8 | | 4 | 15 | — | 40 | 41 | 0.51 |

*The ratio based on the support (AlCeZrO$_x$).

[Evaluation 1 of Oxygen Storage Capacity (OSC)]

The exhaust gas purifying catalysts of Examples 1 and 2 and Comparative Examples 1 and 2 were subjected to endurance under heating at 900° C. over 2 hours while flowing a stoichiometric gas having a composition shown in Table 2 below. Similarly, the exhaust gas purifying catalysts of these Examples and Comparative Examples were subjected to endurance under heating at 1,000° C. over 2 hours.

TABLE 2

| Composition of Stoichiometric Gas for Endurance | | | | | |
|---|---|---|---|---|---|
| | $N_2$ (%) | $CO_2$ (%) | NO (ppm) | CO (ppm) | $C_3H_6$ (ppmC) | $H_2O$ (%) |
| Gas Composition | balance | 12 | 2,500 | 6,000 | 3,000 | 10 |

The OSC of each exhaust gas purifying catalysts of Examples and Comparative Examples subjected to endurance at 900° C. and at 1,000° C. was evaluated. In this measurement of OSC, a thermogravimetric analyzer was used and, by alternately flowing hydrogen and oxygen at 300° C. to repeatedly oxidize and reduce the exhaust gas purifying catalyst, the amount of OSC per g of the exhaust gas purifying catalyst was determined from the change in weight.

FIG. 1 illustrates the results of Examples 1 and 2 and Comparative Examples 1 and 2.

As understood from FIG. 1, in comparison with the exhaust gas purifying catalysts of Comparative Example 1 wherein platinum was used and Comparative Example 2 wherein iron was loaded on the support, the exhaust gas purifying catalysts of Examples 1 and 2 have excellent OSC after endurance. This is believed to be because iron oxide is dispersed and at least partially solid-dissolved in the ceria-zirconia solid solution, and thereby the catalytic activity of the iron oxide is maintained even after endurance. Also, after endurance at 1,000° C., the exhaust gas purifying catalyst of Comparative Example 2 wherein iron oxide was loaded on the support was significantly deteriorated.

[Evaluation 2 of Oxygen Storage Capacity]

Exhaust gas purifying catalysts of Examples 3 to 8 were subjected to endurance under heating at 1,000° C. over 2 hours while flowing a stoichiometric gas having a composition shown in Table 2.

Figure 2:
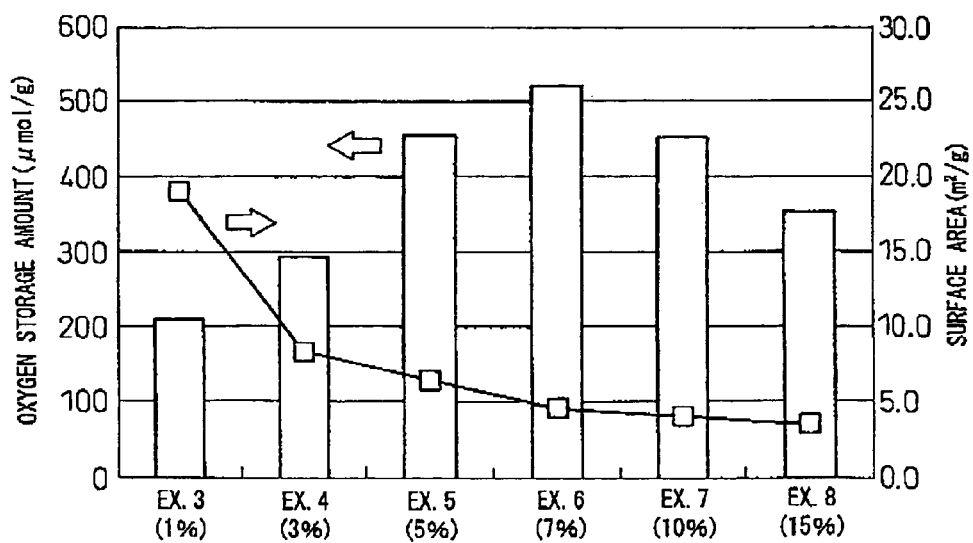
FIG. 2 is a view showing OSC and the surface area, regarding exhaust gas purifying catalysts of Examples 3 to 8 after endurance.

The OSC of the exhaust gas purifying catalysts of Examples 3 to 8 was evaluated as above. In combination with this evaluation, the exhaust gas purifying catalysts of Examples 3 to 8 were determined for the surface area by a nitrogen adsorption method. FIG. 2 illustrates the results.

It is understood from FIG. 2 that, as the content of the iron oxide in the exhaust gas purifying catalysts of Examples 3 to 8 of the present invention increases, the surface area of the exhaust gas purifying catalyst is decreased. However, the OSC increases up to a certain degree of iron oxide content, despite reduction in the surface area, and good OSC is achieved when the iron oxide content is from 3 to 15 mol %, particularly from 5 to 10 mol %. This is believed to be because catalytic activity of the iron oxide in the ceria-zirconia solid solution compensates the effect of reduction in the surface area of the exhaust gas purifying catalyst.

Incidentally, the OSC is decreased in Examples 7 to 8, despite the iron oxide content larger than in Example 6. This suggests that, in the catalysts of Examples of the present invention, mainly cerium exerts the OSC, and iron oxide acts as a catalytic active site of promoting storage and release of oxygen.

[XRD Analysis]

Figure 3:
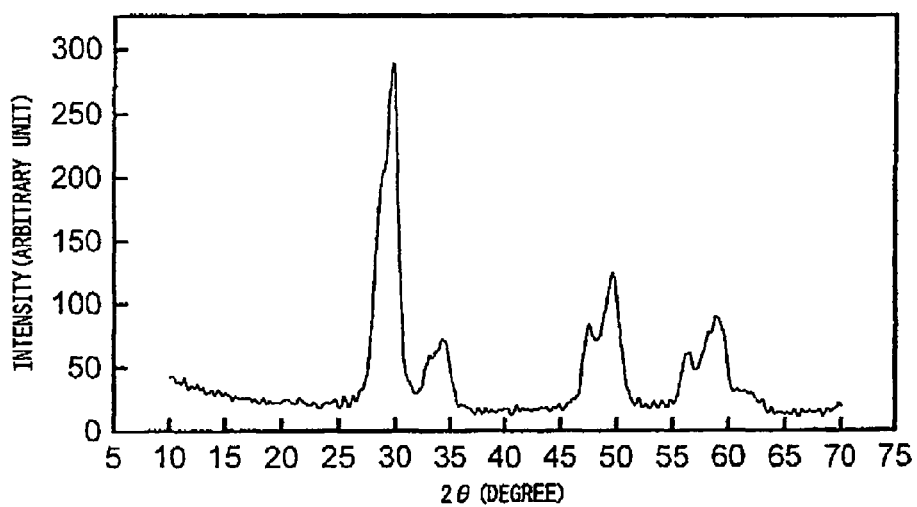
FIG. 3 is a view showing the XRD analysis results, regarding the exhaust gas purifying catalyst of Example 1 after firing at 800° C.
Figure 4:
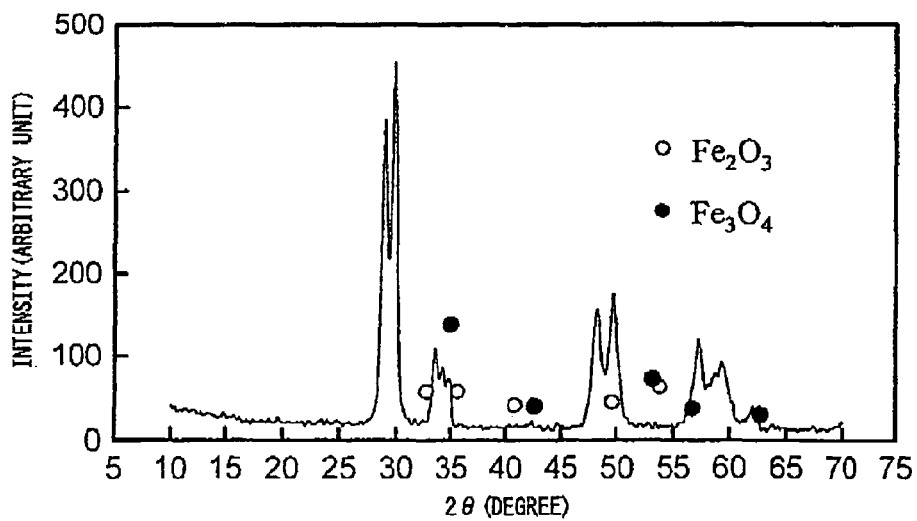
FIG. 4 is a view showing the XRD analysis results, regarding the exhaust gas purifying catalyst of Example 1 after firing at 1,000° C.

The catalyst of Example 1 was heated at 800° C. over 2 hours in air, thereby subjected to endurance. After this endurance, XRD (X-Ray Diffraction) analysis was performed. FIG. 3 illustrates the results. FIG. 4 illustrates the XRD analysis results of the catalyst of Example 1 subjected to endurance at 1,000° C. over 2 hours in air.

As understood from FIGS. 3 and 4, a peak of a single iron oxide ($Fe_2O_3$ or $Fe_3O_4$) was not detected after endurance at 800° C. and at 1,000° C. This indicates that in the catalyst of Example 1 of the present invention, a single iron oxide was not precipitated even when it is heated in air, i.e., in an oxidative atmosphere.

The invention claimed is:

1. A process for producing an exhaust gas purifying catalyst, comprising:
   providing a liquid dispersion comprising a hydrophobic solvent phase and an aqueous phase dispersed therein,
   hydrolyzing a cerium salt, a zirconium salt, an iron salt and a salt of a metal selected from the group consisting of an alkaline earth metal and a rare earth excluding cerium in the aqueous phase dispersed in said liquid dispersion to precipitate a metal oxide precursor, and then aggregating the metal oxide precursor, and
   drying and firing said aggregated metal oxide precursor.

2. The process according to claim 1, wherein the aqueous phase dispersed in the liquid dispersion has a droplet diameter of from 2 to 100 nm.

3. An exhaust gas purifying catalyst comprising:
   a ceria-zirconia solid solution,
   an iron oxide dispersed and at least partially solid-dissolved in said ceria-zirconia solid solution, and
   a metal oxide selected from the group consisting of an alkaline earth metal oxide and a rare earth oxide excluding ceria, which is dispersed and at least partially solid-dissolved in said ceria-zirconia solid solution,
   wherein the exhaust gas purifying catalyst is obtained by the process of claim 1.

4. The exhaust gas purifying catalyst according to claim 3, wherein the amount of the iron constituting said iron oxide is from 1 to 20 mol % based on all metal atoms contained in the exhaust gas purifying catalyst.

5. The exhaust gas purifying catalyst according to claim 3, wherein the amount of the metal constituting said metal oxide selected from the group consisting of an alkaline earth metal oxide and a rare earth oxide excluding ceria is from 1 to 20 mol % based on all metal atoms contained in the exhaust gas purifying catalyst.

6. The exhaust gas purifying catalyst according to claim 4, wherein the amount of the metal constituting said metal oxide selected from the group consisting of an alkaline earth metal oxide and a rare earth oxide excluding ceria is from 1 to 20 mol % based on all metal atoms contained in the exhaust gas purifying catalyst.

7. The exhaust gas purifying catalyst according to claim 3, wherein the molar ratio of zirconium/(cerium+zirconium) in said ceria-zirconia solid solution is from 0.2 to 0.8.

8. The exhaust gas purifying catalyst according to claim 4, wherein the molar ratio of zirconium/(cerium+zirconium) in said ceria-zirconia solid solution is from 0.2 to 0.8.

9. The exhaust gas purifying catalyst according to claim 5, wherein the molar ratio of zirconium/(cerium+zirconium) in said ceria-zirconia solid solution is from 0.2 to 0.8.

10. The exhaust gas purifying catalyst according to claim 6, wherein the molar ratio of zirconium/(cerium+zirconium) in said ceria-zirconia solid solution is from 0.2 to 0.8.

* * * * *